(12) United States Patent
Keegan et al.

(10) Patent No.: US 7,387,337 B2
(45) Date of Patent: Jun. 17, 2008

(54) BOOSTER SEAT

(75) Inventors: Charles H. Keegan, Roslindale, MA (US); Richard A. Daley, North Scituate, RI (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 11/453,065

(22) Filed: Jun. 15, 2006

(65) Prior Publication Data

US 2006/0250005 A1   Nov. 9, 2006

Related U.S. Application Data

(60) Division of application No. 10/377,810, filed on Mar. 4, 2003, now Pat. No. 7,104,603, which is a continuation-in-part of application No. 10/217,702, filed on Aug. 13, 2002, now abandoned.

(60) Provisional application No. 60/312,016, filed on Aug. 13, 2001.

(51) Int. Cl.
  *A47D 1/10*   (2006.01)
(52) U.S. Cl. ............... 297/256.13; 297/256.11; 297/325
(58) Field of Classification Search ......... 297/250.1, 297/256.11, 256.13, 325, 256.1
  See application file for complete search history.

(56) References Cited

U.S. PATENT DOCUMENTS

| 628,166 | A | 7/1899 | Sheridan |
| 1,739,366 | A | 12/1929 | Lang |
| 2,521,281 | A | 9/1950 | Brousseau |
| 2,919,748 | A | 1/1960 | Alden |
| 3,948,556 | A | 4/1976 | Hyde et al. |
| 4,058,342 | A | 11/1977 | Ettridge |
| 4,288,123 | A | 9/1981 | Cone |
| 4,348,048 | A * | 9/1982 | Thevenot ............ 297/256.13 |
| 4,383,714 | A | 5/1983 | Ishida |
| 4,762,364 | A | 8/1988 | Young |
| 4,779,922 | A | 10/1988 | Cooper |
| 4,854,638 | A | 8/1989 | Marcus et al. |
| 4,886,315 | A | 12/1989 | Johnson |
| 4,938,603 | A | 7/1990 | Turner et al. |
| 4,951,997 | A | 8/1990 | Kenney |
| 4,957,302 | A * | 9/1990 | Maxwell ............... 297/325 |
| 4,971,389 | A | 11/1990 | Staggs et al. |
| D330,843 | S | 11/1992 | Anderson |
| 5,172,955 | A | 12/1992 | Freese et al. |

(Continued)

FOREIGN PATENT DOCUMENTS

GB    2216405 A    10/1989

*Primary Examiner*—Peter Brown
(74) *Attorney, Agent, or Firm*—Edell, Shapiro & Finnan LLC

(57) ABSTRACT

An adjustable booster-type seat having a base 10 for supporting the seat on a flat surface, a riser 12 mounted for height adjustment on the base, a body support 14 having a seat and back mounted for arcuate motion on the riser 12 for changing the angular position of the body support 14 and being adjustable in height by virtue of the adjustability of the riser on the base. A restraint bar 16 is detachably connected to the body support and in turn adjustably carries a tray 18 enabling the tray to be moved toward and away form the back and to be mounted at different angles with respect to the body support 14.

14 Claims, 12 Drawing Sheets

U.S. PATENT DOCUMENTS

| | | |
|---|---|---|
| 5,183,311 A | 2/1993 | Meeker et al. |
| 5,238,292 A | 8/1993 | Golenz et al. |
| 5,364,137 A | 11/1994 | Shimer |
| 5,380,062 A | 1/1995 | Nania |
| 5,474,355 A | 12/1995 | Lerner et al. |
| 5,507,550 A | 4/1996 | Maloney |
| 5,527,090 A | 6/1996 | Cone, II |
| 5,551,751 A | 9/1996 | Sedlack et al. |
| 5,609,393 A | 3/1997 | Meeker et al. |
| 5,681,082 A | 10/1997 | Drexler |
| 5,690,382 A | 11/1997 | Cone |
| 5,746,478 A | 5/1998 | Lumley et al. |
| 5,765,911 A | 6/1998 | Sorenson |
| 5,810,432 A | 9/1998 | Haut et al. |
| 6,033,019 A | 3/2000 | Hession-Kunz et al. |
| 6,050,643 A | 4/2000 | Kain et al. |
| D424,312 S | 5/2000 | Hotaling et al. |
| 6,056,363 A | 5/2000 | Maddox |
| 6,161,898 A | 12/2000 | Brevi |
| 6,382,725 B1 | 5/2002 | Carroll |
| 6,428,099 B1 | 8/2002 | Kain |
| 6,450,578 B1 | 9/2002 | Taggett |
| 6,454,350 B1 | 9/2002 | Celestina-Krevh et al. |
| 6,554,358 B2 * | 4/2003 | Kain ................... 297/256.13 |
| 6,746,080 B2 * | 6/2004 | Tsugimatsu et al. ... 297/256.13 |
| 6,773,060 B2 | 8/2004 | Sher et al. |
| 6,773,064 B2 | 8/2004 | Treen et al. |
| 6,832,813 B2 | 12/2004 | Tomas et al. |
| 2003/0102702 A1 | 6/2003 | Daley et al. |
| 2003/0151285 A1 | 8/2003 | Keegan et al. |
| 2005/0029852 A1 | 2/2005 | Chen |

* cited by examiner

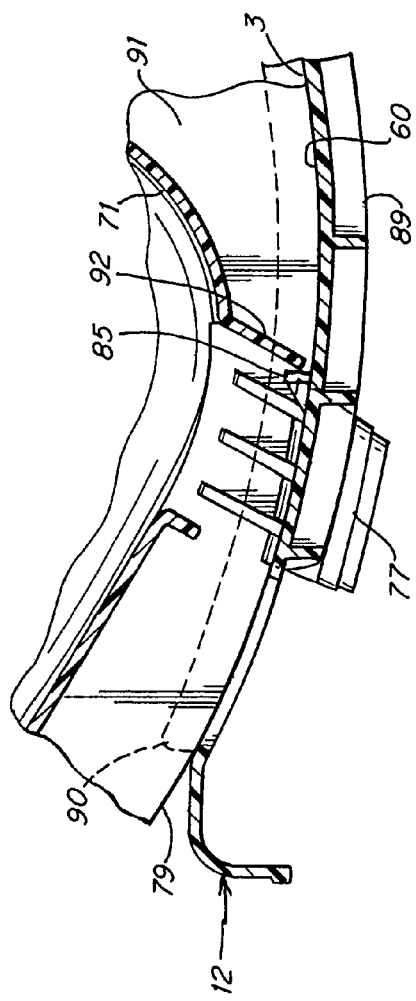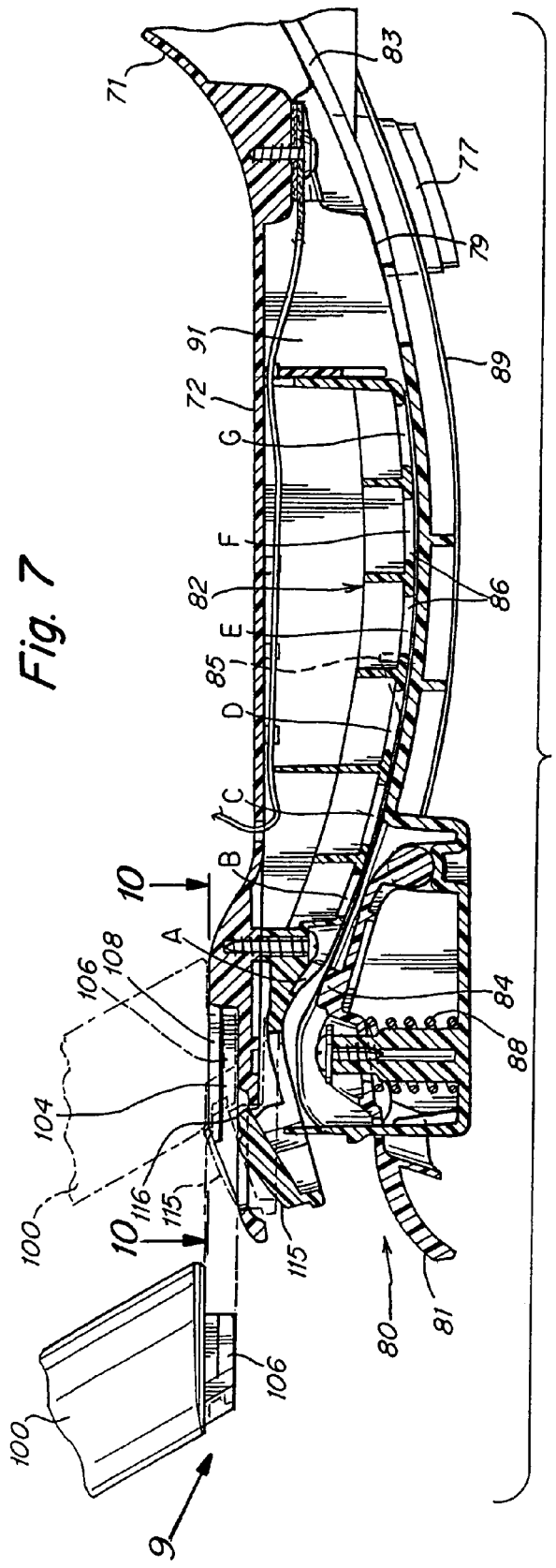

US 7,387,337 B2

BOOSTER SEAT

CROSS-REFERENCE TO RELATED APPLICATIONS

This application is a divisional application of Applicants' earlier filed, application Ser. No. 10/377,810 filed Mar. 4, 2003 now U.S. Pat. No. 7,104,603, which is a continuation-in-part of application Ser. No. 10/217,702 filed Aug. 13, 2002 now abandoned, and which application claims benefit of Applicants' earlier filed provisional application Ser. No. 60/312,016 filed Aug. 13, 2001, all of which are incorporated by reference herein in their entirety.

FIELD OF THE INVENTION

BACKGROUND OF THE INVENTION

This application relates to booster-type seats. In accordance with one aspect of the application, the elevation of the body support may be varied. In accordance with another aspect of the application, the angular disposition of the body support may be varied. These features enable the seat to accommodate newborns who are fed by a caregiver and toddlers seated at a table. Another aspect of the present application is the adjustability of the tray with respect to the body support so as to move the tray toward and away from a child in the seat to accommodate the child's size, as well as to change the angular disposition of the tray with respect to the body support so that the tray may be placed in a substantially horizontal position when the body support is in its reclined position. This feature enables a caregiver to place food on the tray while feeding a young child without the food sliding off the tray. Yet another aspect of the present application is the unitized construction of the seat and backrest that comprise the body support so that the two move together as the body support is adjusted. And yet another aspect of the present application is the collapsibility of the backrest so as to accommodated storage and transporting of the seat. This is particularly advantageous in seating that has a unitized seat and backrest.

Additional objects, features and advantages of the present application will become apparent to those of ordinary skill in the art upon consideration of the following detailed description of preferred embodiments exemplifying the best mode of carrying out the subject matter of this application as presently perceived.

BRIEF DESCRIPTION OF THE DRAWINGS

FIG. 4A is a fragmentary cross-sectional view taken along line 4A-4A of FIG. 4.

FIG. 4B is a fragmentary cross-sectional view taken along line 4B-4B of FIG. 4.

FIG. 4C is a fragmentary bottom plan view of a post and socket as seen along line 4C-4C of FIG. 4.

FIG. 7 is a fragmentary cross-sectional view of the sliding arrangement between seat and riser taken along line 7-7 of FIG. 5.

FIG. 8 is a fragmentary cross-sectional detail view of the rack assembly of FIG. 4 shown on an enlarged scale.

DETAILED DESCRIPTION OF THE INVENTION

The present application relates to booster seats and feeding seats (hereinafter collectively called boosters or booster seats) used by babies and toddlers.

Figure 1:
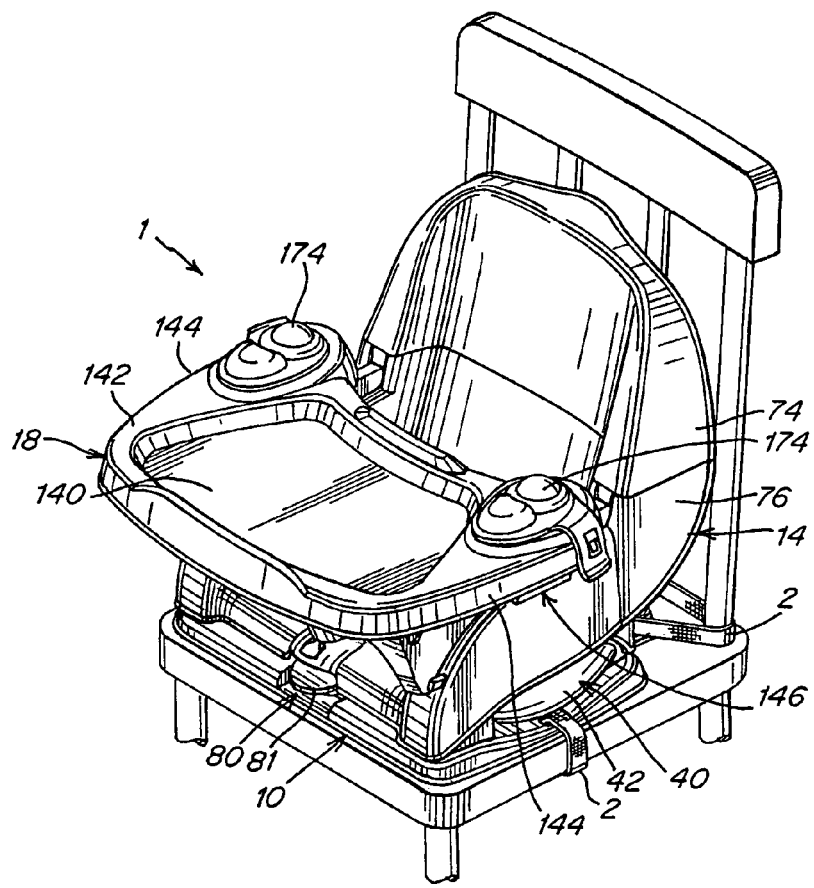
FIG. 1 is a front perspective view of a booster seat strapped to a chair.
Figure 1A:
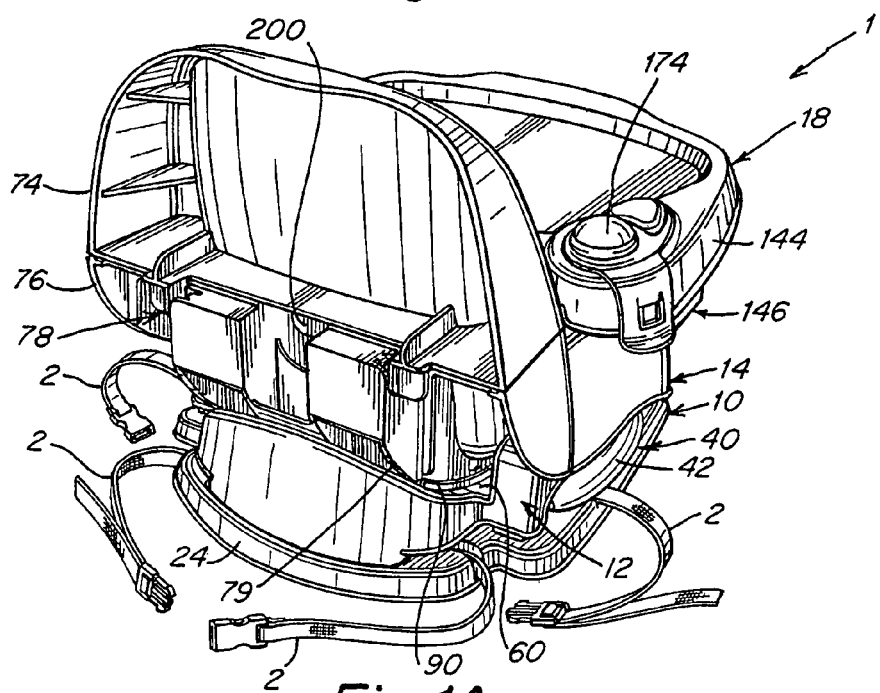
FIG. 1A is a rear perspective view of the booster seat of FIG. 1.

As shown in FIG. 1, booster seat 1 includes straps 2 for releasably fastening the booster seat to a chair. The rear of the booster seat is shown in FIG. 1A.

Figure 1B:
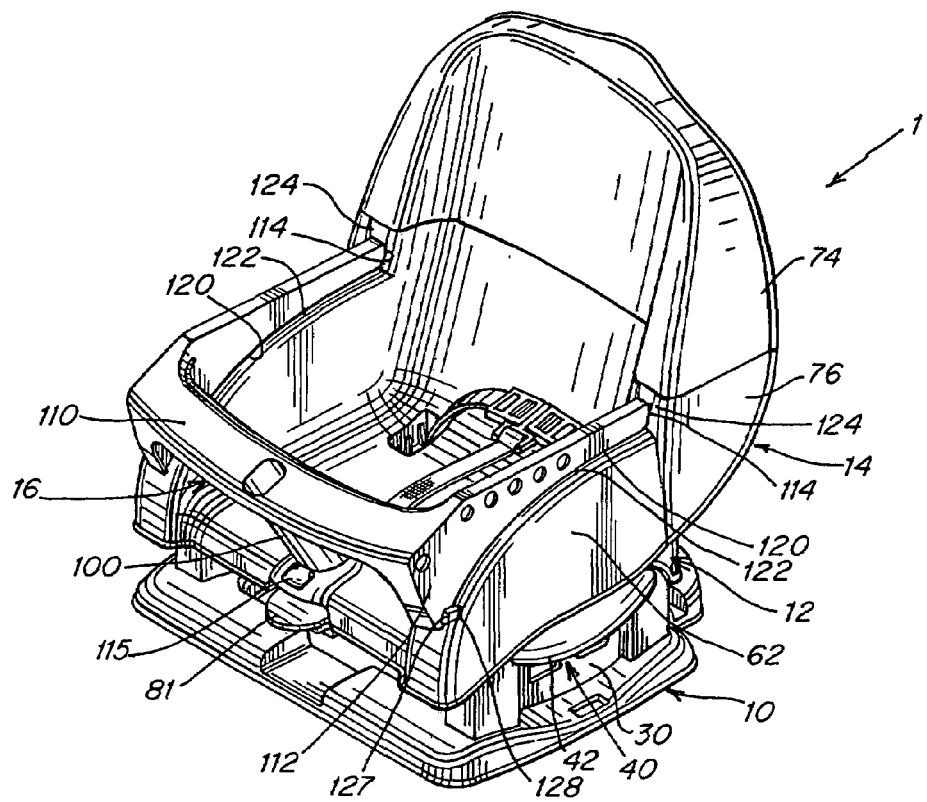
FIG. 1B is a front perspective view of the booster seat of FIG. 1 with the tray removed and the riser at full height.

As shown in FIG. 1B, booster seat 1 is adjustable to raise the booster seat.

Figure 2:
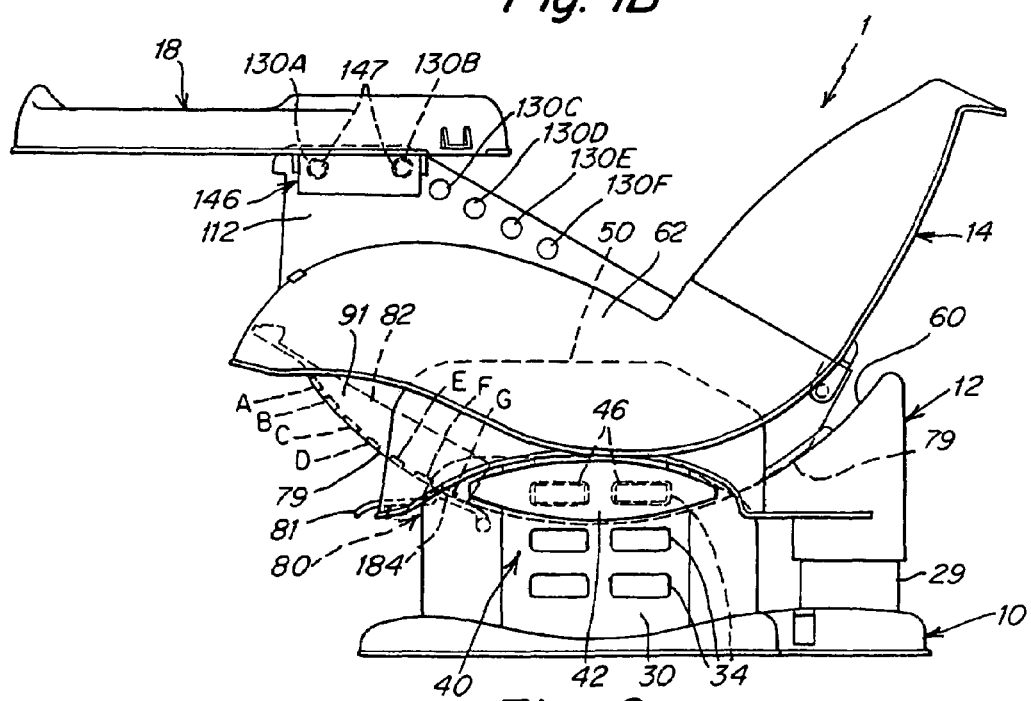
FIG. 2 is a schematic side elevational view of the booster seat fully reclined, the riser at full height and tray installed at a forward position.

As shown in FIG. 2, booster seat 1 is adjustable to recline the booster seat.

Figure 3:
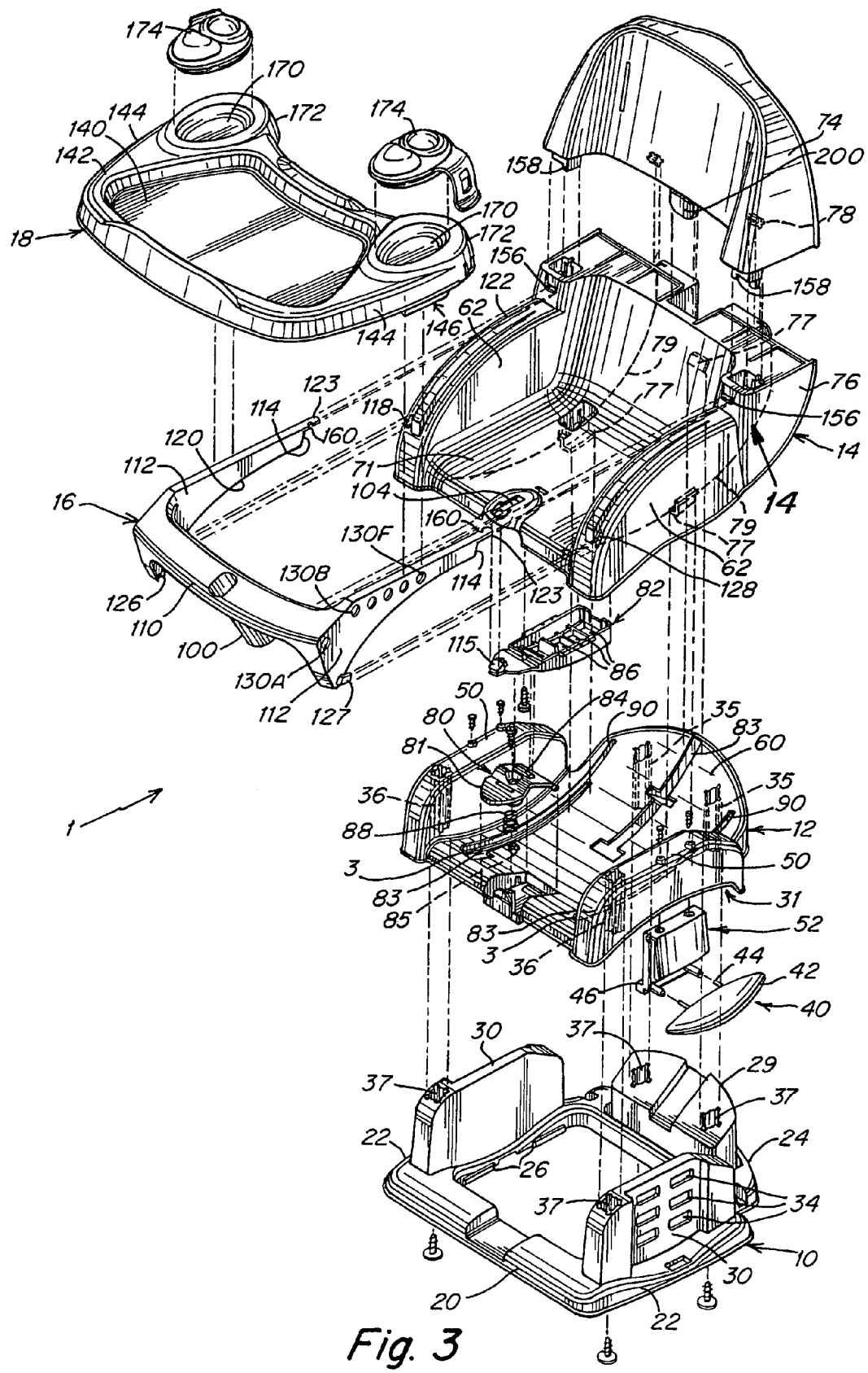
FIG. 3 is an exploded perspective view of the booster seat.

As best seen in FIG. 3, the booster seat includes as its major parts, a base 10, riser 12 and seat and back assembly (sometimes called a body support) 14. The booster seat also includes a restraint bar 16 and tray 18. All of these parts typically may be injection molded of suitable plastic material such as polypropylene or other equivalent material. As will be evident from the drawings each of the seat and back assembly 14, the riser 12 and the base 10 may be formed as a monolithic member.

The base 10 serves as a bottom support for the seat and back assembly 14 and is particularly designed to be placed on a flat surface orienting the base in a substantially horizontal plane. The riser 12 is essentially permanently connected to the base 10 (forming a base assembly) although the riser height above the base is adjustable so as to in turn provide adjustment for the elevation of the seat and back assembly 14. The riser 12 also provides an arcuate track 3 for supporting the seat and back assembly 14 so as to enable the seat to be moved through an arc of perhaps 30° so that the child in it may be seated in an upright position or in a number of different reclined positions. This feature is illustrated in FIGS. 3, 5, 7 and 8. As explained below, the embodiment shown provides a number of different settings for the seat assembly on the riser that allows incremental adjustments in the orientation of the seat and backrest assembly of approximately 30° so that six or more different angular reclined positions are available The restraint bar 16 is removably connected to the seat and back assembly 14 and will restrain the baby or toddler in the booster from sliding off the seat and beneath the tray 18. In addition, the restraint bar 16 provides the support for the tray 18 and also provides means for orienting the angular relationship of the tray with respect to the seat and backrest assembly.

The base 10 is shown in FIGS. 1B and 3 to be generally rectangular in shape having a front bar 20, side bars 22 and a rear bar 24. The side bars 22 and/or rear bar 24 carry one or more anti-skid foot members 26 (FIG. 3) to restrain the base from sliding on the surface upon which it rests. Each anti-skid foot 26 is made of material well known in the art that will optimally prevent the base from slipping when placed on surface. The restraint bar 16 may take any number of forms and be attached to some or all of the members that define the frame-like shape. The lower surface of the base 10 defines a uniform supporting plane so that the base will not tip or rock when placed on a flat surface. The base 10 also includes a pair of upwardly extending generally vertical side walls 30 and a rear generally vertical wall 29 that in this embodiment are telescopically received in cavities 31 and 32, respectively, and in the riser 12.

Figure 2A:
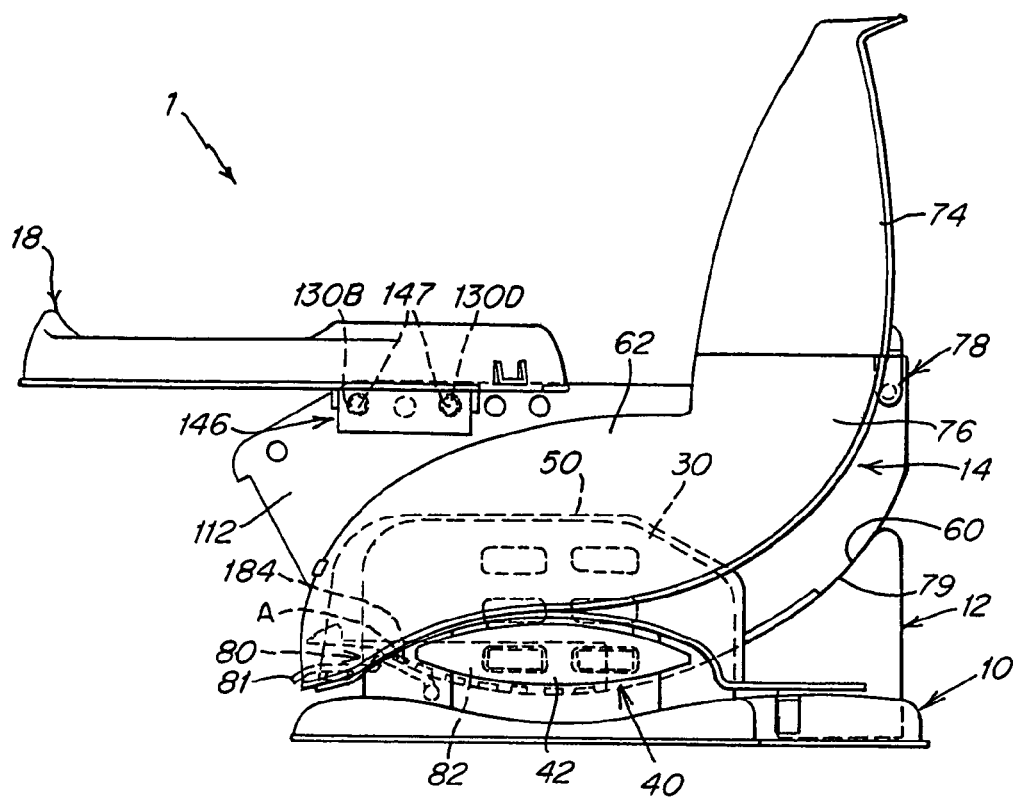
FIG. 2A is a schematic side elevational view of the booster seat upright, riser at lowermost height and tray installed at a midway position.
Figure 5:
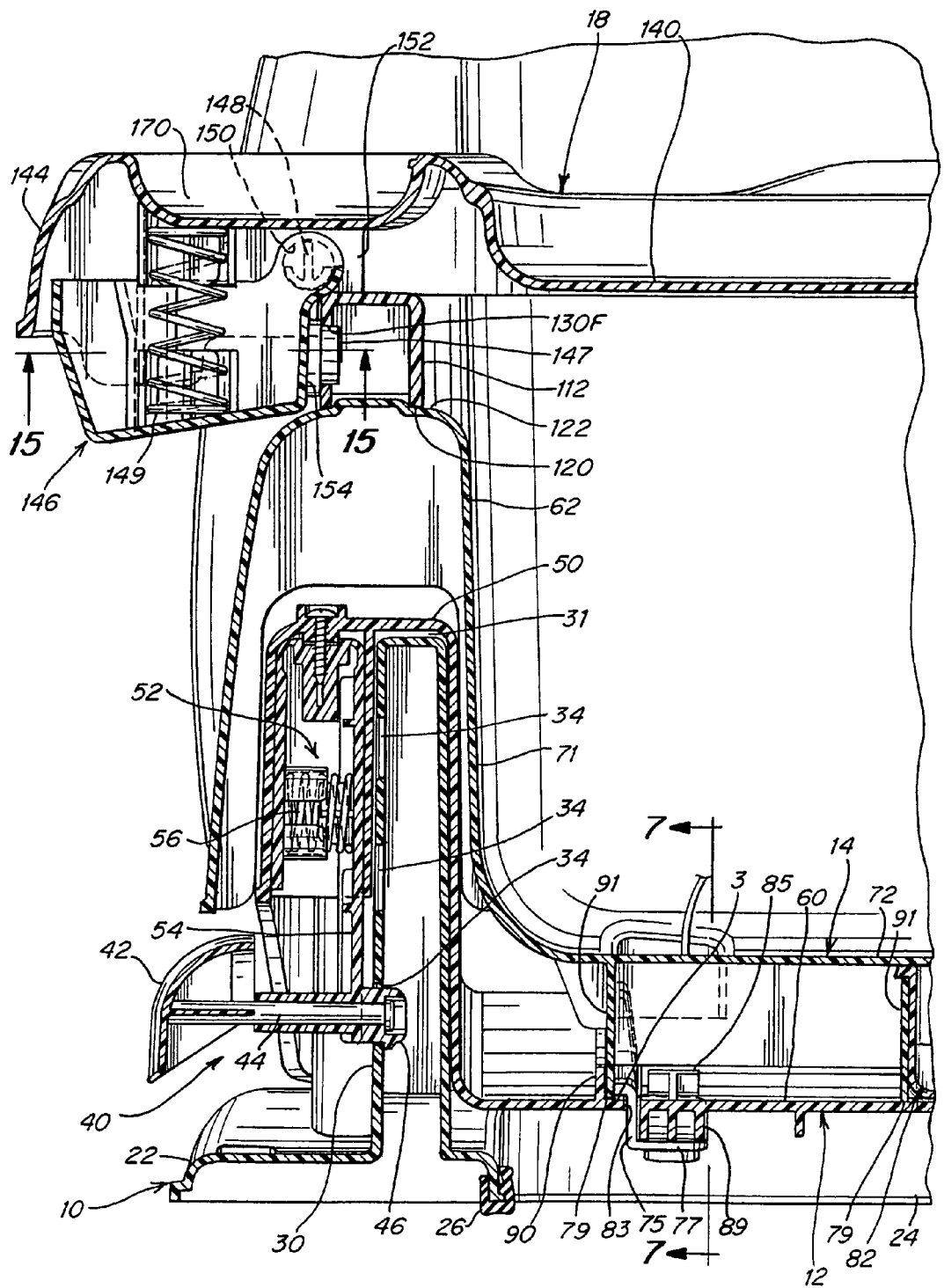
FIG. 5 is a fragmentary cross-sectional view taken along line 5-5 of FIG. 4 with the tray and riser catches in their engaged position.
Figure 6:
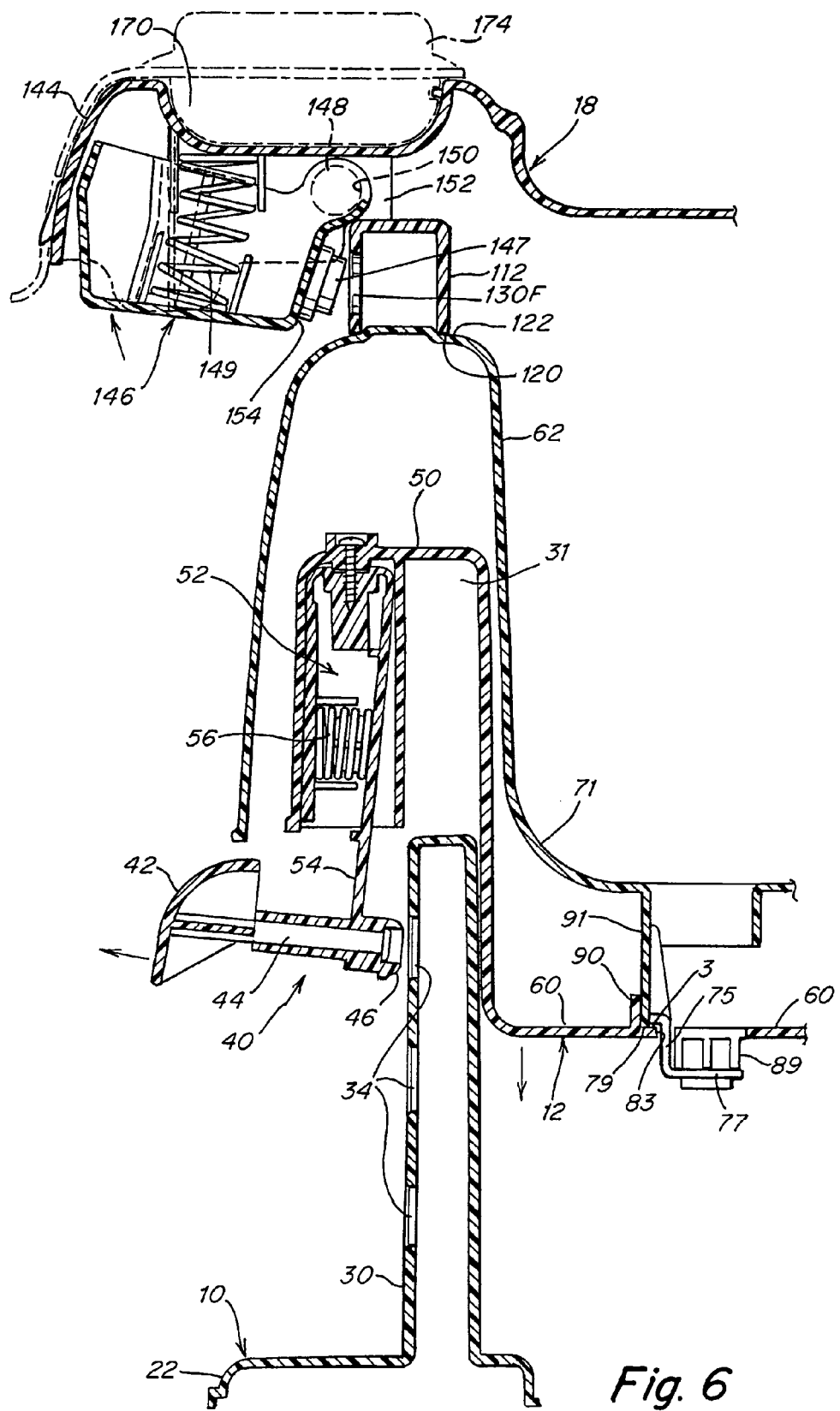
FIG. 6 is a schematic cross-sectional view similar to FIG. 5, but with the tray and riser catches released.
Figure 9:
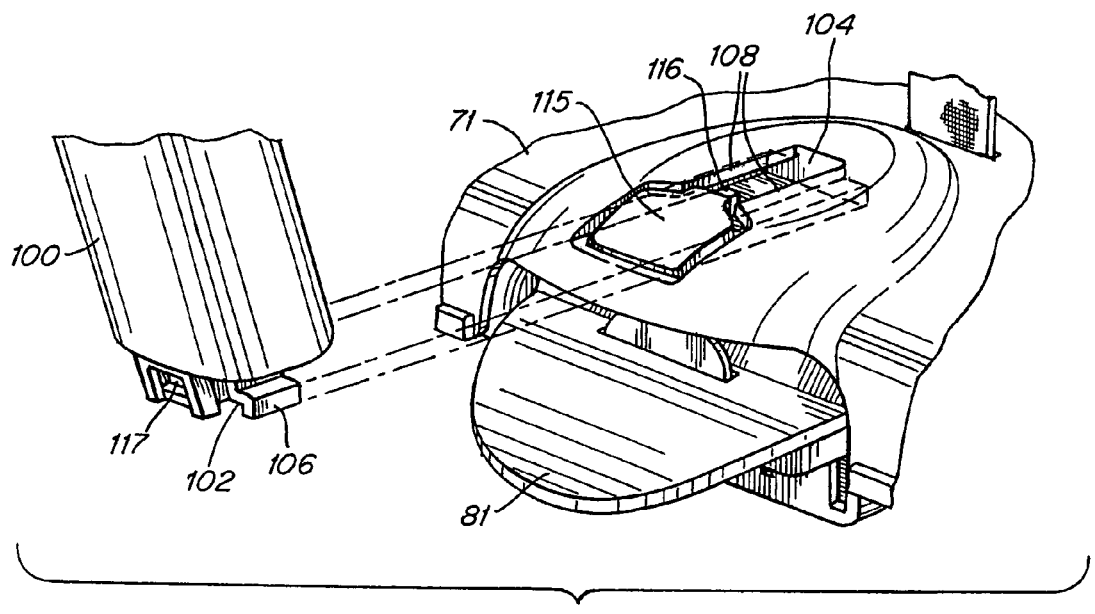
FIG. 9 is a fragmentary exploded perspective detail view of the restraint bar release means as seen along arrow 9 of FIG. 8.
Figure 10:
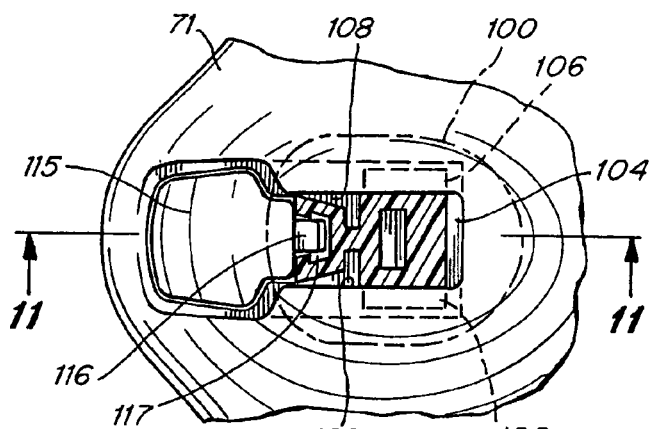
FIG. 10 is a fragmentary cross-sectional detail plan view of restraint bar release mechanism taken along line 10-10 of FIG. 8.
Figure 11:
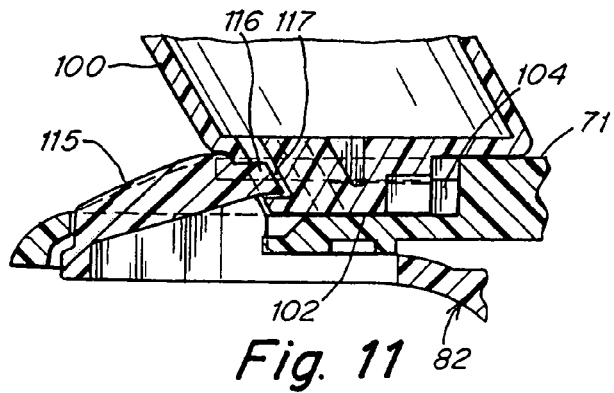
FIG. 11 is a fragmentary cross-sectional detail view of taken along line 11-11 of FIG. 10.

In FIG. 2, the riser 12 is shown in its elevated position on the vertical side walls 30 of the base, while in FIG. 2A the riser is shown in its lowermost position on the base. The height adjustment of the riser on the base is achieved by virtue of three tiers of slots (or holes) 34 formed on the outside surfaces of the side walls 30 that extend upwardly from the side bars 22 of the base 10. While preferably three pairs of slots 34 are provided in the walls 30 to provide three adjustments in the height of the riser, obviously, a different number may be employed and the connections may be provided on the inner sides or the ends of the side walls 30. The slots 34 cooperate with the height adjustment mechanisms 40 carried on each side of the riser, to support the riser on the base at the appropriate elevation for the baby or toddler to be seated in the booster. FIG. 6 which is a schematic cross-sectional view of one side of the riser shows a handle 42 fixed to a pair of posts 44 that, in accordance with this embodiment, are attached to a pair of tabs 46 that are sized to register with the slots 34. As seen in FIG. 7, when the tabs 46 are disposed in one of the selected pairs of slots, they rigidly retain the riser in a fixed position on the base. It is to be appreciated that the height adjustment mechanisms are provided on each side of the riser and cooperate with the slots 34 on each side wall 30 of the base 10. In FIG. 6 the cavity 31 is shown adjacent mechanism 52 for biasing the tabs 46 into the slots 34. The cavity 31 receives the side wall 30 of the base. In order to change the position of the riser 12 on the base, the handles 42 on each side of the riser must be pulled outwardly against the biasing mechanism 52 so as to free the tabs 46 form the slots 34. When that is done, the riser may be raised and lowered as desired, and the handles are released when the tabs 46 are aligned with the desired pair of slots 34. A connection (see FIGS. 4 and 4C) is made between the riser and base that prevents the riser from being removed from the base. The riser 12 is free to be adjusted between the various elevations afforded by the pairs of slots 34, but the connection between the base and riser prevents the riser from being lifted off the base. The mechanism 52 may conveniently be disposed in the arms 50 of the riser adjacent the cavity 31 that accommodates the walls 30 of the base. Mechanism 52 includes a lever arm 54 which is fixed at one end and has tabs 46 at the other end. One or more spring-like members 56 biases the lever and tabs into the slots 34 (as shown in FIG. 5).

As best seen in FIG. 3, the rear of the riser 12 includes a pair of fixed vertically extending tubular members 35 and a second similar pair of fixed vertically extending tubular members 36 at the front of the riser 12. Tubes 37 on the base 10 correspond to tubes 35 and 36 so that as the riser 12 moves vertically with respect to the base 10 the tubular members 35 and 36 telescope into (or out of) the tubes 37 in the base 10. As shown in FIG. 3, each tubular member 35 and 36 and tube 37 may have a circular or, in the preferred embodiment, a non-circular or fluted type cross-section. This arrangement serves to ensure that the riser 12 moves smoothly with respect to the base 10 without any undue twisting or angular movement. That is, the telescoping members having a fluted or crenulated cross-section, such as with parallel grooves incised on the shaft, providing an antirotational fit between each tubular member 35 or 36 and tube 37 having a corresponding complimentary shape. The fluting and corresponding tube shape limits movement to the telescoping direction and adds stability to the base and riser combined structure. Although four tubular member and tube combinations are shown it should be understood that other numbers of such members such as two or three may be used.

As shown in FIG. 3, the riser 12 has an arcuate platform 60 that forms a pair of arcuate tracks 3 supporting the seat and back assembly 14. As seen in FIG. 6, curved seat edge 79 is supported on the arcuate track 3 part of the riser platform 60. At least two seat edges 79 (one on each side) contact the riser platform 60 at a track 3 and each edge 79 is arcuately shaped to compliment or match the arcuate shape of the riser platform 60 enabling the seat to slide with respect to the platform 60 when reclining or returning to an upright position. The platform 60 directly supports the seat and back assembly 14 for sliding motion between the most reclined and upright positions of the assembly (see FIGS. 2 and 2A) and a side rail guide 90 is provided adjacent each guide slot 83 for guiding the seat movement with respect to the riser 12. As seen in FIG. 6, support 91 on the underside of seat 71 slides, and is guided, with respect to rail guide 90 to maintain seat movement in the desired arcuate path. When the seat and back assembly 14 is placed on the riser, the seat arms 62 that are open on the bottom receive the arms 50 of the riser as is evident as shown for example, in FIGS. 3 and 6.

Figure 4:
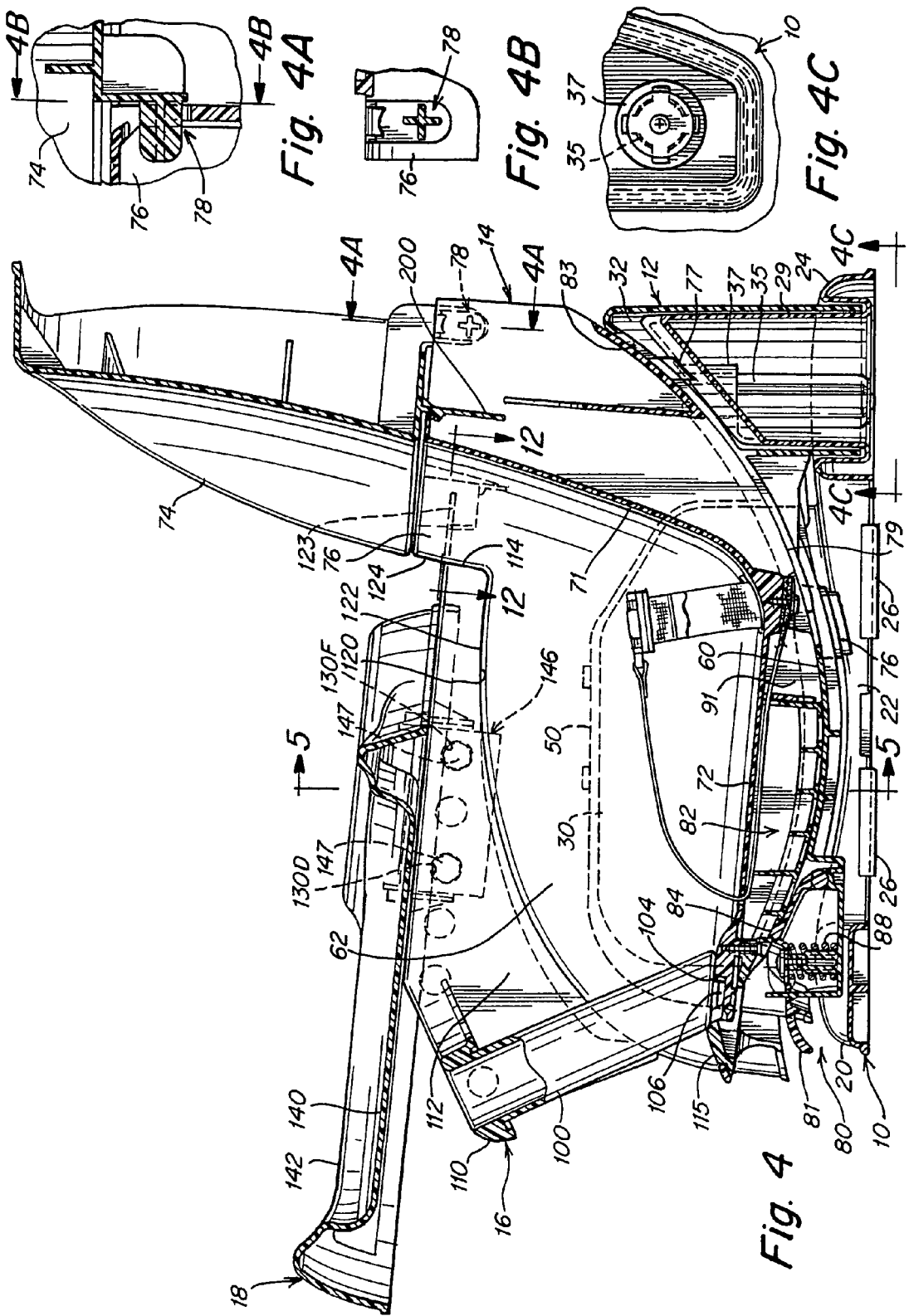
FIG. 4 is a cross-sectional side view of the booster seat shown in a reclined position with the riser in the lowermost position.

The reclining motion of the seat and backrest assembly 14 on the riser, as illustrated in FIGS. 2 and 2A is controlled by the latch or locking mechanism 80 located in a recess in the riser 12 as shown in FIGS. 3, 4 and 8. The rack 82 located in a recess in seat and back assembly 14 is coupled to the seat bottom 72, and the lever 81 is shown positioned to selectively engage any segment A-F of the rack. The lever 81 is urged in a raised or operative rack engaging position. In FIG. 7 the lever is shown to carry a tab or button 84 on its upper surface in position to engage any of the openings 86 in any of rack segments A-G. The lever 81 may be biased by a spring 88 or be formed to have a natural bias to force tab or button 84 into locking engagement in one of the openings 86. To slide the back and seat assembly 14 on the riser, the lever 81 must be moved to cause the tab or button 84 to disengage an opening 86 in the rack 82, and, preferably after sliding movement to a new position, when released it automatically reengages the rack to hold the seat and back assembly 14 in a fixed position on the riser 12.

In FIG. 2A the seat and back assembly 14 is shown in the most upright position and in FIGS. 2 and 4 the assembly is shown displaced in a maximum reclined position and a first reclined position approximately 5° and 30° respectively from the upright position. As suggested above, additional positions may be set at 0°, 10°, 15°, 20°, and 25° from the upright position. All of the positions are established in the rack 82. Lever 81 and spring 88 assist with insertion and removal of button 84 into openings 86 in the rack 82, so that the seat and back assembly 14 may be moved to any of the positions established by the rack. Tabs 77 (FIGS. 5 and 6) are carried on the bottom of seat and back assembly 14 and extend through guide slots 83 in the riser to guide the reclining and return motion of the seat and back assembly 14 with respect to the riser 12 and to retain the seat and back assembly 14 on the riser 12 (see FIG. 6). When reclining or returning to upright an underside of the seat slides on arcuate platform 60. Arms 75 extend tabs 77 to reach across rails 89 (one on each side) on the riser 12. The maximum reclining position and the upright position may be defined when the arms 75 reach either end of guide slots 83. Thus, the arms 75 encountering the end of guide slots 83 may serve as a stop to limit the reclining or upright positions. Other similar stop members may be provided such as is shown in FIG. 7 wherein a portion 92 of the rear wall of the seat and back assembly 14 is shown engaging a ramp-type stop 85 on the platform 60 of the riser 12. Abutments (not shown) may be placed on the riser 12 to encounter tabs 77 at the extreme end of their arcuate travel. While a preferred arrangement is shown in FIGS. 3 and 5-8 attaching the seat and back assembly 14 to the riser 12 so as to permit the tilt adjustment and locking of the assembly, other arrangements may also be used including tracks, rollers and roller brakes and swing-type linkages, as used in motion furniture.

Figure 2B:
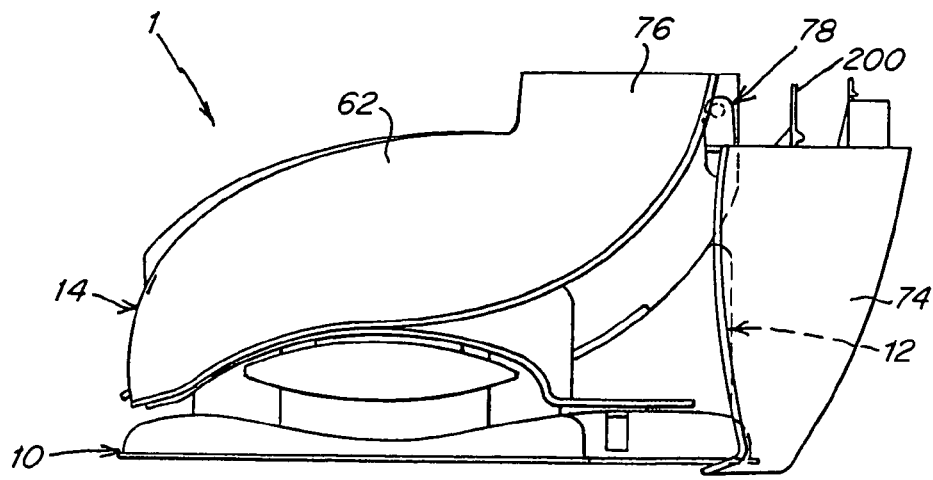
FIG. 2B is a schematic side elevational view of the booster seat configured for storage.
Figures 12, 13:
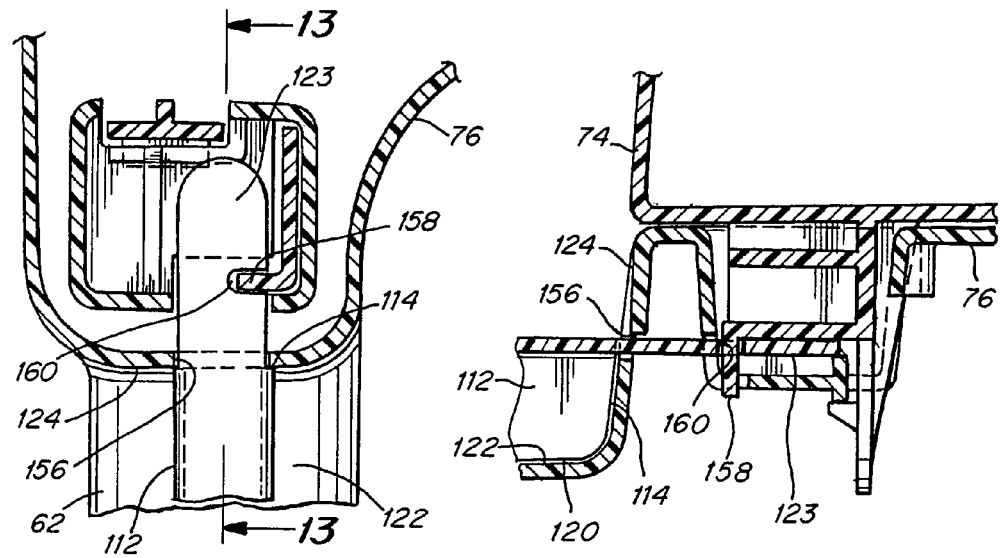
FIG. 12 is a fragmentary cross-sectional detail view of the restraint bar arms retention mechanism taken along line 12-12 of FIG. 4.
FIG. 13 is a fragmentary cross-sectional detail view taken along line 13-13 of FIG. 12.
Figure 14:
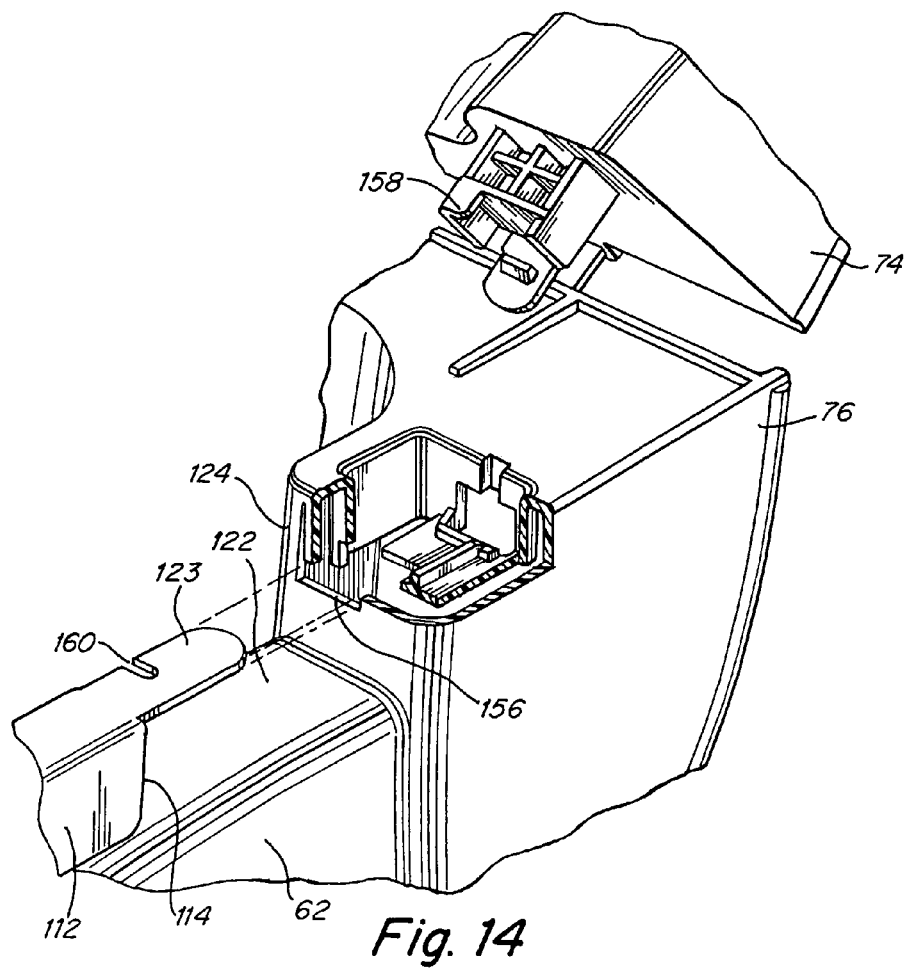
FIG. 14 is a fragmentary perspective detail view of the restraint bar arms retention mechanism as seen along arrow 14 of FIG. 3.

FIGS. 9-14 illustrate a preferred embodiment for attaching the restraint bar 16 to the seat and back assembly 14. The restraint bar 16 locks to the seat and back assembly 14 but may be removed when not in use. The restraint bar 16 includes a crotch post 100 that carries on its lower end, a locking plate 102 (see FIG. 9) that is sized to fit within a T-shaped opening 104 in the seat. When inserted in the opening 104 (depressing upwardly biased release tab 115) and thereafter moved rearwardly with respect to the seat so that the side edges 106 of the locking plate 102 pass beneath the flanges 108, the crotch post 100 will be locked in position. As shown in FIG. 1B, the crotch post 100 extends downwardly from and is connected to the front rail 110 of the restraint bar 16. The restraint bar also includes a pair of side panels 112 connected to the ends of the front rail 110. The rear ends 114 of the side panels 112 bear against the uprights 124 at the back of the arms 62 of the seat and back assembly 14. The lower edge 120 of each panel 112 rests on the upper surfaces 122 of the arms 62. The rear end extensions 123 are inserted into the openings 156 of seat and back assembly 14 and the upper portion of the backrest 74 is moved to the FIG. 2A position thereby locking the rear end extensions 123 to the seat and back assembly 14. FIG. 14 shows one of the rear end extensions 123 about to be inserted into opening 156 and the upper portion of the seat and backrest 74 about to close to its upright operable position. FIGS. 12 and 13 show one of the rear end extensions 123 in the locked position with locking edge 158 of the upper portion of the backrest 74 inserted into slot 160. Movement of the upper portion of the backrest from its FIG. 2A position to its FIG. 2B position unlocks the rear end extensions 123 (locking edge 158 is removed from slot 160) permitting the restraint bar 16 to be removed. Thus, the restraint bar 16 is held firmly on the seat. As best seen in FIGS. 3 and 9-11 to free the restraint bar 16 from the seat, the restraint bar 16 must be moved rearward (to the right in FIG. 11) slightly to remove the front edge 116 of the release tab 115 from the channel 117 on the end of crotch post 100. Tab 115 is then depressed by pressing with a finger or thumb and crotch post 100 may be moved forwardly so that the side edges 106 of the crotch post 100 are freed from beneath the flanges 108, and the restraining bar may be slid forward and lifted from the front end by grasping the front rail 110 so as to free the tabs 126 and 127 from the slots 118 and 128 (FIG. 3). This arrangement is clearly shown in FIG. 9. In that figure side edges 106 are shown freed from flanges 108 and the locking plate 102 is shown freed from the T-shaped opening 104 in the seat. While a preferred embodiment for attaching the restraint bar is illustrated, other types of fasteners may be used to join the bar to the seat and the back assembly.

In FIGS. 1B, 2 and 2A, a series of tray locating holes are shown provided in the outer sides of panels 112 of the restraint bar 16. (The holes are visible only in one arm in those figures.) In the embodiment shown, six such holes are provided in each side panel, identified as 130A through 130F. The holes 130B through 130F are shown aligned along the top edge 132 of the panels, and the hole 130A is shown disposed below the plane defined by the centers of the holes 130B through F. The holes allow the angular orientation of the tray 18 with respect to the seat 71 to be varied and also allow the tray to be moved toward and away from the backrest portions 74, 76 of the seat and back assembly 14.

Figure 15:
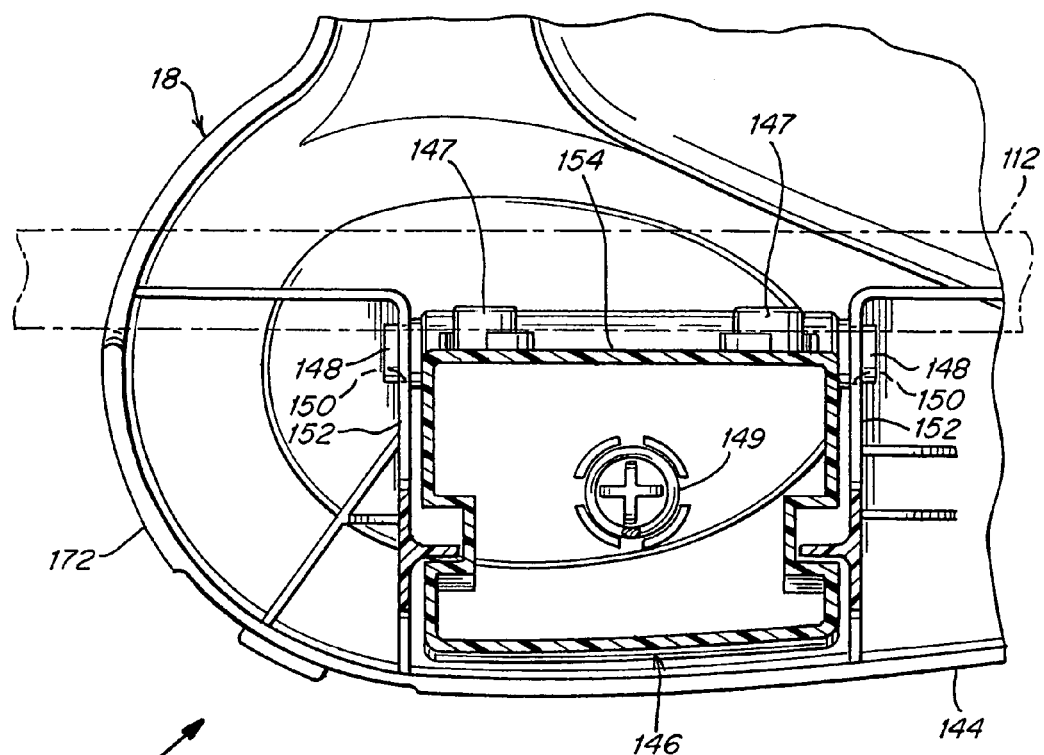
FIG. 15 is a fragmentary cross-sectional bottom plan view of the tray locking mechanism taken along line 15-15 of FIG. 5.
Figure 16:
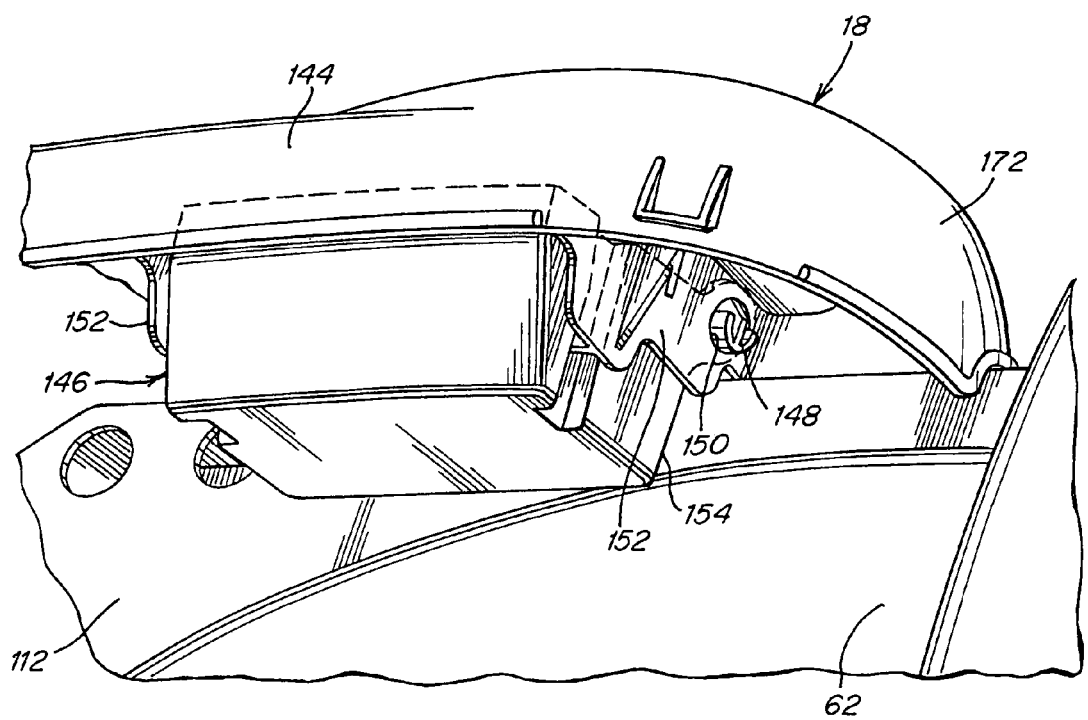
FIG. 16 is a fragmentary bottom perspective view of the tray locking mechanism as seen along arrow 16 of FIG. 15.

The tray 18 as shown in FIGS. 1, 2, 2A and 3 includes a flat central table surface 140 and a surrounding lip 142 that will assist in retaining items placed on the surface 140. On each side 144 of the tray, a latch mechanism 146 is disposed inside the lip 142 and pivotally supported on axles 148 (one shown in FIG. 16) mounted in openings 150 provided in the flanges 152 on the tray bottom. The pivotally supported tray latch mechanism 146 in the illustrated embodiment includes a pair of pegs 147 on its inboard side 154 (see FIGS. 15 and 16) that are spaced apart to register with selected pairs of holes 130A through 130F on the sides of the restraint bar 16. As seen in FIG. 6, compression spring 149 is compressed to remove peg 137 from hole 130F. Otherwise spring 149 would hold pet 137 in the hole 130F. The pegs are spaced apart the same distance as the space between the holes 130A and 130B, and that spacing is the same as the spacing between pairs 130B and 130D 130C and 130E and 130D and 130F. Thus, in the rearwardmost position of the tray on the restraint bar 16, the pegs 147 engage in the holes 130D and 130F but the tray may be incrementally moved away from the backrest (further forward with respect to the seat) by engaging pairs of holes 130C and 130E or 130B and 130D. In any of those three alternative positions, the tray will be at the same angular relationship with the seat and backrest assembly 14 but will simply be closer to or further away from the baby or toddler seated in the seat 71. When the pegs 147 register with the holes 130A and 130B the tray will assume a different angular relationship with respect to the seat and back assembly 14, that is, as shown in FIG. 2. The tray ordinarily will only be mounted in the holes 130A and 130B when the seat and back assembly is in the most rearwardly inclined orientation as in FIG. 2. Because in the embodiment shown the seat and backrest assembly 14 is able to tilt approximately 30.degree. rearwardly from its upright position, the different angular orientation for the tray with respect to the seat and back assembly is highly desirable as in that position the tray is more substantially horizontal. That orientation of the seat and back assembly 14 and the tray 18 is ordinarily used for feeding or otherwise attending newborns, and the tray may be utilized by the attendant to carry the food or other items, and they will not slide off the tray. The other positions of the tray ordinarily are used when the seat and back assembly is in the more upright positions. For example, in FIG. 4 where the seat is upright and partially reclined, the tray is shown connected in its rearwardmost position utilizing holes 130D and 130F. While in the illustrated embodiment the holes for mounting the tray are provided in the restraint bar, it should be appreciated that the holes may, as an alternative, be provided in the arms 62 of the seat 71. In that arrangement the configuration of the arms and/or the lip or rim 142 of the tray may require reconfiguration to enable the connection between the arms and tray to be made. As yet another modification, the tray may be carried by the crotch post 100 and a tilt mechanism may be provided to enable the plane of the tray to be varied.

When the booster seat is used by a toddler seated at a table, the restraint bar and tray are not ordinarily used and rather are detached from the body support so that the booster seat is configured as shown in FIG. 3.

It should also be appreciated that in other embodiments the latch mechanism 146 may take other forms. For example, snap type latches, or rack type connectors (such as used to lock the seat and back assembly on the riser) may be employed for that purpose.

In FIG. 3 the tray is shown to include a pair of toy wells 170 at its rear corners 172. The wells 170 are designed to receive a variety of different toys 174 to entertain the baby or toddler seated in the booster seat.

The upper portion of the backrest 74 of the seat and back assembly 14 is foldable to the collapsed position. Folding of the upper portion 76 is about a hinge 78 at the top of the lower portion. In FIGS. 2A, 2B, 4 and 14 the backrest 74, 76 of the seat and back assembly 14 is shown to be foldable so as to reduce the overall size of the booster seat, particularly for purposes of packaging, travel or storage. The backrest is shown in FIG. 2A to be in the erect position, while in FIG. 2B the top portion 74 of the backrest is folded back so as to hang downwardly from the hinges 78 connecting the top portion 74 with the lower portion 76 of the backrest. The hinges 78 on each side of the backrest enable the top portion 74 to fold backward in the manner shown in FIGS. 2B and 14. However, a locking member 200 is provided so as to releasably maintain the upper portion 74 of the of the backrest in the operative position of FIG. 2A.

In other embodiments the hinges may be provided intermediate the side edges, and different types of latches may also be utilized to hold the backrest in its operative configuration, such as snap-type flanges utilized to hold the restraint bar on the arms of the seat.

Figure 17:
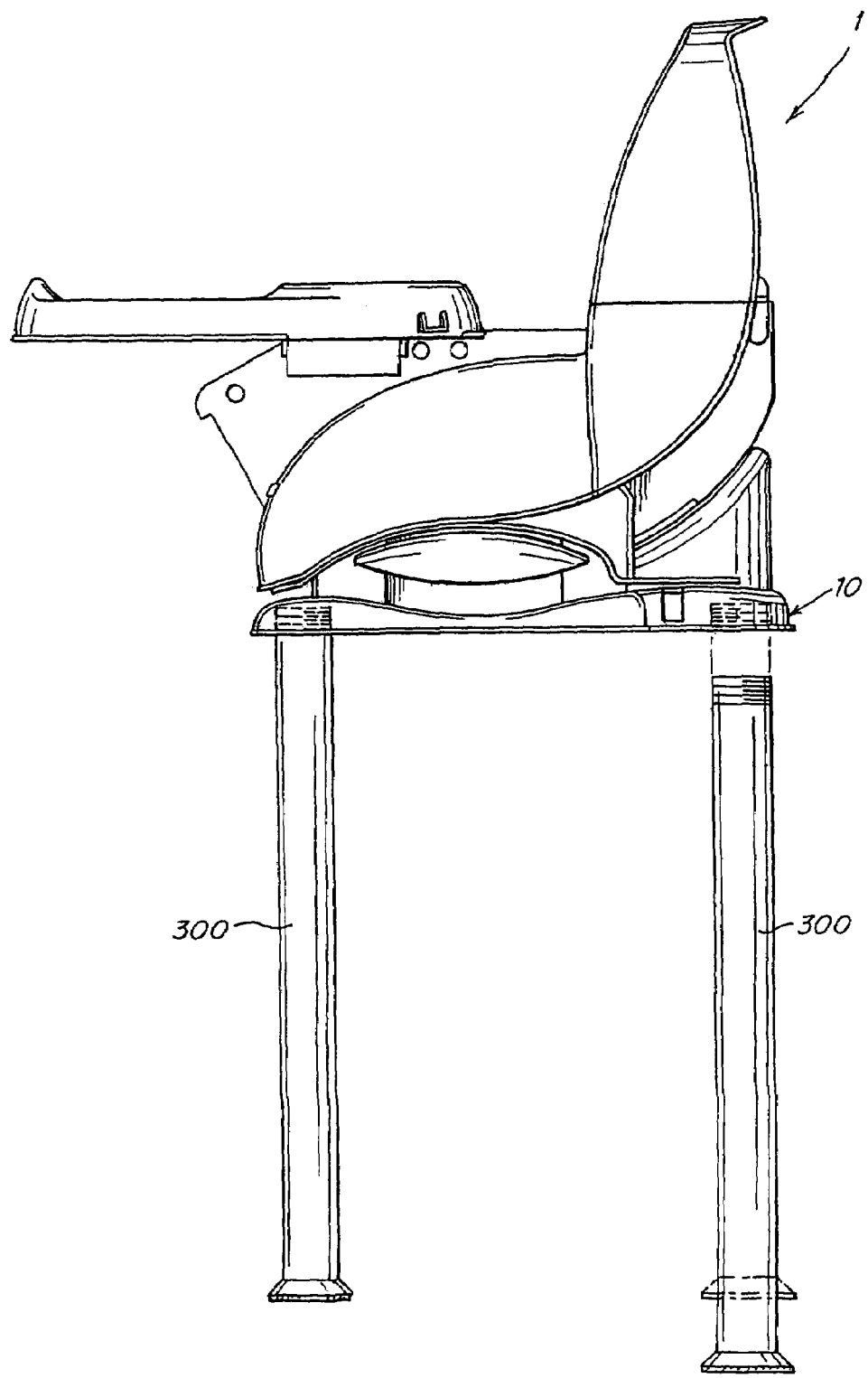
FIG. 17 is side view of the booster seat with removable legs.

In FIG. 17 the booster seat is shown with removable legs 300. The underside of the base 10 is provided with connectors such as threaded type receptors for receiving the threaded ends of the removable legs. In this manner the legs may be attached to the booster seat enabling its use as a high-chair. Other attachment configurations may be provided to releasably attach the legs 300 to the booster seat.

From the foregoing description it will be appreciated that numerous other modifications may be made of the illustrated embodiments without departing from the spirit and scope of the invention. Therefore, it is not intended that the scope of the invention be limited to the embodiments illustrated and described. Rather, its scope is to be determined by the claims and their equivalents.

We claim:

1. A booster seat comprising, a base, a seat with a backrest, a riser, means for supporting the seat with respect to the base to permit relative movement along an arc, means for locking and releasing the seat with respect to the base in a position from upright to reclined, and means for raising and lowering the seat on the base, the base including a first side wall and an opposite second side wall, the means for raising and lowering the seat on the base includes a first height adjustment mechanism having a post configured to engage the first side wall of the base and a second height adjustment mechanism having a post configured to engage the second side wall of the base.

2. The booster seat of claim 1, wherein the means for supporting the seat includes a riser having a curved surface, the riser being disposed between the base and the seat, the seat having a surface complementary to the curved surface of the riser.

3. The booster seat of claim 1, wherein the means for supporting the seat includes a riser disposed between the base and the seat, the riser including an arcuate platform with an arcuate track, the seat continuously engaging the track as the seat moves along an arc.

4. The booster seat of claim 1, further comprising:
a riser, wherein the means for locking and releasing the seat includes a latch mechanism coupled to the riser, the latch mechanism being selectively engageable with the seat.

5. The booster seat of claim 4, wherein the seat includes a plurality of openings, and the latch mechanism is selectively engageable with the openings.

6. The booster seat of claim 5, wherein the latch mechanism includes a tab, and the tab is biased into engagement with one of the openings.

7. The booster seat of claim 1, wherein the riser has a first side and an opposite second side, the first height adjustment mechanism being proximate to the first riser side and the second height adjustment mechanism being proximate to the second riser side.

8. The booster seat of claim 7, wherein each base side wall includes a plurality of slots, and each height adjustment mechanism includes a handle, each post of each height adjustment mechanism being selectively engageable with a slot on a base side wall.

9. A booster seat comprising, a base, a seat including a seat with a backrest and a seating surface between spaced hollow arms, a monolithic riser having a curved platform portion defining an arc and supporting the seat on the base to permit movement of the seat along the arc from an upright position to a reclined position, the curved platform portion being between spaced hollow walls of the riser, arcuate tracks on a surface of the curved platform portion of the riser facing the seat, slots in the riser adjacent the arcuate tracks receiving arms extending from the seat with at least one tab on each arm, each tab engaging a guide surface of the riser facing away from the seat, the guide surface being shaped to guide the riser and seat during relative arcuate movement, at least one stop member on a surface of the riser adjacent the seat engaging the seat to arrest arcuate movement in one direction, at least one abutment member on an opposite side of the riser from the seat engaging a tab to arrest arcuate movement in a second direction, abutment surfaces on the seat adapted to engage the arcuate tracks for guiding movement of the seat along the arc, guides supported on the seat on a side opposite the seating surface and facing the riser, the guides adapted to contact the riser, a rack in a recess in the seat and a lever in a recess on the riser, the lever being adapted to selectively engage the rack at intervals along the arc whereby the riser is locked to arrest arcuate movement and unlocked to permit arcuate movement.

10. A booster seat comprising:
   a base, the base including opposite side walls with openings formed therein;
   a riser, the riser being configured to receive a portion of the base, the riser including an upper surface with an arcuate configuration, a first height adjustment mechanism including a post that is configured to engage an opening in one of the base side walls, and a second height adjustment mechanism including a post that is configured to engage an opening in the other of the base side walls, each of the first and second height adjustment mechanisms being adjustable to raise and lower the riser on the base; and
   a seat with a backrest, the seat being mounted on the riser and including a lower surface having an arcuate configuration, the lower surface being substantially complimentary to the upper surface of the riser, the riser and the seat including a latch mechanism being operable to lock and release the seat with respect to the riser.

11. The booster seat of claim 10, wherein the latch mechanism includes a tab moveably mounted on the riser and a plurality of openings provided on the seat, the tab being biased toward the plurality of openings and engageable therewith to lock the seat relative to the riser and prevent movement between the seat and the riser.

12. The booster seat of claim 10, wherein the seat is mounted on the riser so that the seat moves relative to the riser and base along an arc.

13. The booster seat of claim 10, further comprising:
   means for limiting the movement of the seat relative to the riser.

14. The booster seat of claim 10, wherein the riser includes cavities configured to receive respective side walls of the base, each of the height adjustment mechanisms being associated with one of the riser cavities.

* * * * *